US012645233B2

(12) United States Patent
Darthenay

(10) Patent No.: US 12,645,233 B2
(45) Date of Patent: Jun. 2, 2026

(54) VOLTAGE REGULATORS WITH SLICED POLE TRACKING

(71) Applicant: NXP B.V., Eindhoven (NL)

(72) Inventor: Frederic Darthenay, Luc sur Mer (FR)

(73) Assignee: NXP B.V., Eindhoven (NL)

( * ) Notice: Subject to any disclaimer, the term of this patent is extended or adjusted under 35 U.S.C. 154(b) by 287 days.

(21) Appl. No.: 18/484,905

(22) Filed: Oct. 11, 2023

(65) Prior Publication Data

US 2024/0126311 A1 Apr. 18, 2024

(30) Foreign Application Priority Data

Oct. 12, 2022 (EP) .................................... 22306544

(51) Int. Cl.
*G05F 1/46* (2006.01)

(52) U.S. Cl.
CPC .................................... *G05F 1/468* (2013.01)

(58) Field of Classification Search
CPC .......... G05F 1/468; G05F 1/565; G05F 3/262; G05F 1/575
See application file for complete search history.

(56) References Cited

U.S. PATENT DOCUMENTS

| | | | | |
|---|---|---|---|---|
| 6,765,374 | B1 | 7/2004 | Yang et al. | |
| 8,115,463 | B2 * | 2/2012 | Wang ...................... | G05F 1/575 323/280 |
| 9,575,498 | B2 | 2/2017 | Peluso et al. | |
| 10,459,468 | B1 * | 10/2019 | Ankamreddi ...... | H03K 17/0822 |
| 2005/0225306 | A1 | 10/2005 | Oddoart et al. | |
| 2013/0241504 | A1 * | 9/2013 | Kumar .................... | G05F 1/565 323/280 |
| 2013/0257401 | A1 | 10/2013 | Fort et al. | |
| 2017/0371365 | A1 * | 12/2017 | Kossel ...................... | G05F 1/46 |
| 2018/0046212 | A1 | 2/2018 | Ming et al. | |

FOREIGN PATENT DOCUMENTS

| | | |
|---|---|---|
| CN | 115016594 A | 9/2022 |

OTHER PUBLICATIONS

Bang S. Lee, “Understanding the Terms and Definitions of LDO Voltage Regulators,” Application Report SLVA079, Oct. 1999, 13 pages, publisher Texas Instruments Incorporated.
Ming, Xin et al., “A High-Efficiency and Fast-Transient Low-Dropout Regulator With Adaptive Pole Tracking Frequency Compensation Technique”, IEEE Transactions on Power Electronics, Nov. 1, 2020, pp. 12401-12415, vol. 35, No. 11, IEEE, Piscataway, NJ, USA.
Sergei Strik, et al., “LDO design solves load transient problems,” Oct. 1-15, 2008, 4 pages, publisher EE Times-Asia.

* cited by examiner

*Primary Examiner* — Lakaisha Jackson

(57) ABSTRACT

Systems and methods for providing voltage regulators with sliced pole tracking are discussed. In some embodiments, a voltage regulator may include: an error amplifier, a voltage-to-current converter coupled to the error amplifier, and a current-to-current converter coupled to the voltage-to-current converter, where the current-to-current converter comprises a sliced pole tracking circuit coupled to a power device, and where the power device is configured to provide an output voltage to a load.

16 Claims, 7 Drawing Sheets

VOLTAGE REGULATORS WITH SLICED POLE TRACKING

CROSS-REFERENCE TO RELATED APPLICATIONS

This application claims the priority under 35 U.S.C. § 119 of application Ser. No. 22/306,544.2, filed on 12 Oct. 2022, the contents of which are incorporated by reference herein.

FIELD

This disclosure relates generally to electronic circuits, and more specifically, to systems and methods for providing voltage regulators with sliced pole tracking.

BACKGROUND

A voltage regulator is an electronic circuit that produces a constant output voltage across a range of output currents. Today, voltage regulators may be found in virtually any electronic device, where they are used to control or regulate voltages provided by a power source to an electrical load. In a typical implementation, multiple voltage regulators may be fabricated as integrated circuits (ICs) on a single semiconductor chip.

At the circuit level, a feedback voltage regulator operates by comparing its output voltage to a reference voltage. The difference between these two voltages—referred to as a "voltage error"—may be amplified and used to control a regulation element in such a way as to reduce the error. This forms a negative feedback control loop where increasing the open loop gain tends to increase the voltage regulator's accuracy, but also reduces its stability.

In many applications, voltage regulators are expected to supply a constant voltage to dynamic loads that can draw vastly different amounts of current over time, while maintaining high efficiency.

BRIEF DESCRIPTION OF THE DRAWINGS

The present invention(s) are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
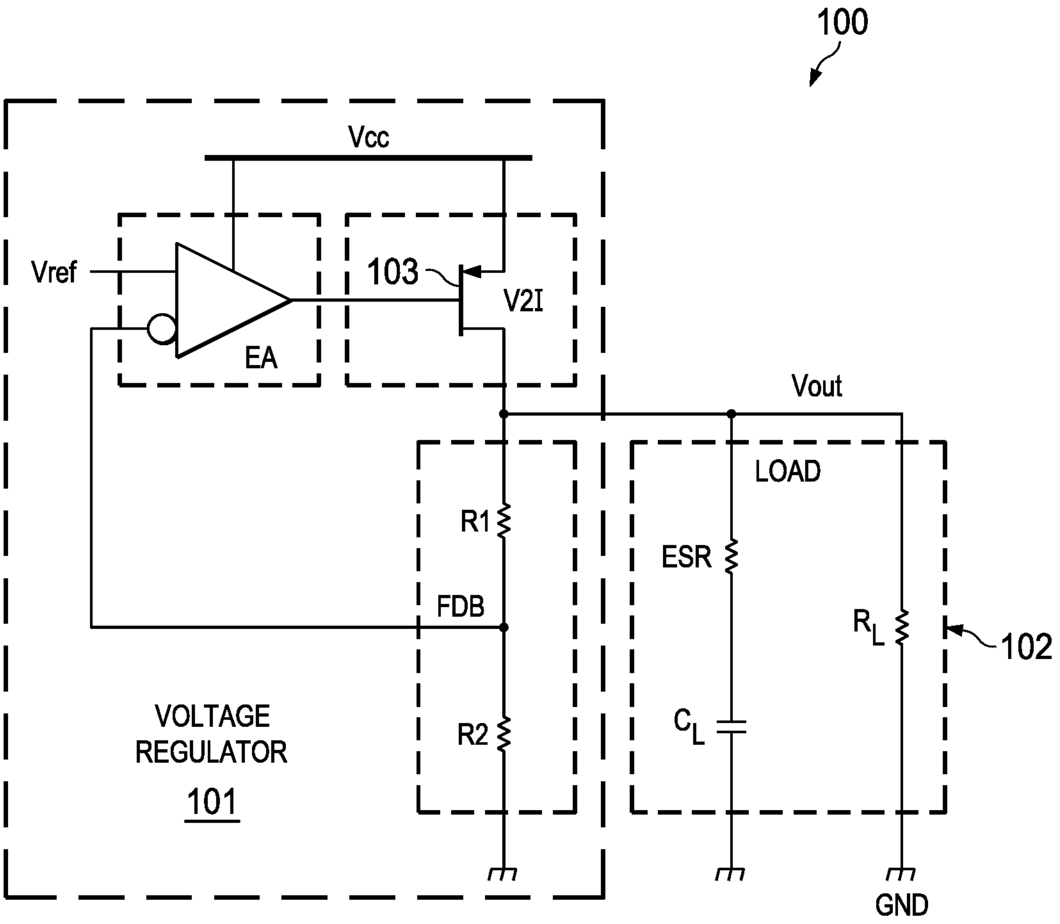
FIG. 1 (PRIOR ART)
FIG. 1 is a diagram of a conventional voltage regulator ("Prior Art").

FIG. 1 ("Prior Art") is a diagram of electronic circuit 100 including conventional voltage regulator 101 coupled to electrical load 102. As depicted, voltage regulator 101 comprises an error amplifier (EA), a power device (V2I) coupled to an output of the error amplifier, and a feedback loop or path (FDB) formed between the output of the power device and the inverting input of the error amplifier.

The power device may include a field-effect transistor (FET) or a bipolar junction transistor (BJT) 103, and the output of the error amplifier may be coupled to a control terminal (e.g., a gate or base) of transistor 103.

The feedback path may be implemented as a voltage divider including R1 and R2. Particularly, the drain or collector terminal of transistor 103 may be coupled to R1, and R2 may be coupled between R1 and ground (GND). As such, the feedback loop may connect a node between R1 and R2 to the inverting input of the error amplifier.

The non-inverting input of the error amplifier may receive a reference voltage (Vref). Also, the error amplifier and a source or emitter terminal of transistor 103 may receive a supply voltage provided by VCC rail.

Load 102 may be modeled as resistance $R_L$ in parallel with decoupling capacitor $C_L$ that exhibits a parasitic equivalent series resistor (ESR).

In operation, the feedback path of voltage regulator 101 senses and conditions the regulated output voltage (Vout). The error amplifier provides a correction signal to the power device, and the power device delivers an electrical current to load 102.

Incidentally, the ESR creates a zero in the gain or pole vs. load current transfer curve of voltage regulator 101. Because the value of ESR can vary over a wide range, it is difficult to stabilize electronic circuit 100 in all conditions.

To attempt to stabilize the output of voltage regulator 101, a pole tracking technique may be implemented. For example, the power device of FIG. 1 may be replaced with a voltage-to-current converter (V2I) followed by a current-to-current converter (I2I) (e.g., a current mirror). In that scenario, the output pole of the error amplifier may be pushed very high because the amplifier no longer drives a large power device; rather, it drives a much smaller device (V2I) that converts an error correction voltage into a current. Moreover, the current-to-current converter does not perform a voltage gain operation, so its pole remains high and tracks the output current.

In most cases, the control terminal(s) of the current-to-current converter may be driven by a diode or similar device. At nominal output currents, the impedance of the driving diode is sufficiently low to drive the control terminal. At low output currents, however, the driving diode's impedance may become insufficient to drive the control terminal and to keep voltage regulator 101 sufficiently fast and stable.

To overcome the stability issue in light load conditions, a strategy may include adding a bleed current source to the output of voltage regulator 101 that artificially increases the biasing current of the driving diode. The bleed current fixes the lowest value of the pole, but at power efficiency penalty because the bleed current is amplified by the output stage.

Another strategy for improving stability in light load conditions may involve coupling an additional resistor between the VCC rail and the control terminal(s) of the current-to-current converter. A drawback of this approach, however, is that as the output load current increases, the current flowing across the additional resistor can become significant.

Yet another strategy for improving stability involves using an active load technique, which may be seen as a refinement of the different pole tracking techniques discussed above. In that regard, FIG. 2 ("Prior Art") is a diagram of electronic circuit 200 having conventional voltage regulator 201 with active pole tracking circuitry 204.

In voltage regulator 201, the output terminal of the error amplifier is coupled to the control terminal of transistor 202 of voltage-to-current converter (V2I). The source or emitter terminal of transistor 202 is coupled to a ground (GND) terminal. Moreover, the drain or collector terminal of transistor 202 is coupled to active load 204 of current-to-current converter (12).

Active load 204 drives the control terminal of transistor 203. The source or emitter terminal of transistor 203 is coupled to the VCC rail. Also, the drain or collector terminal of transistor 203 is coupled to R1, and it provides a regulated Vout to load 102.

In contrast with circuit 100 of FIG. 1, here the pole tracking taking place in circuit 200 is not continuously controlled by a fraction of the output load current. Instead, active load 204 toggles between different impedance configurations depending upon whether load 102 is light or heavy.

Compared to a current-to-current converter (I2I) having a constant gain (GI2I), when active load 204 operates in light load conditions, the gain of the current-to-current converter is reduced, thus the current flowing through the active diode is greater than, and the pole reaches a higher frequency than, former pole tracking techniques. In heavy load conditions, the gain of the voltage-to-current converter increases and returns to the maximum GI2I value.

The inventor hereof has recognized, however, that, in many situations, there is a need for pole voltage regulator pole tracking techniques that can provide a gain/pole vs. load current transfer curve that is smooth or arbitrarily set up over a finite set of trip points. Moreover, voltage regulator should also provide for a second stage's gain vs. load current transfer curve that can be set up piecewise. At light loads, the second stage's pole should be pushed to a higher frequency than can be obtained with active load techniques of FIG. 2.

There is also a need for load regulation reaction time to remain very fast in any load conditions, and for any bleed current applied to continuously adapt to the load current to guarantee that the input current does not reach values that are too low. Additionally, dynamic digital controllability may be employed to anticipate a change in load current (e.g., when a configuration or setting is changed), and change the current mirror's ratio accordingly.

Figure 3:
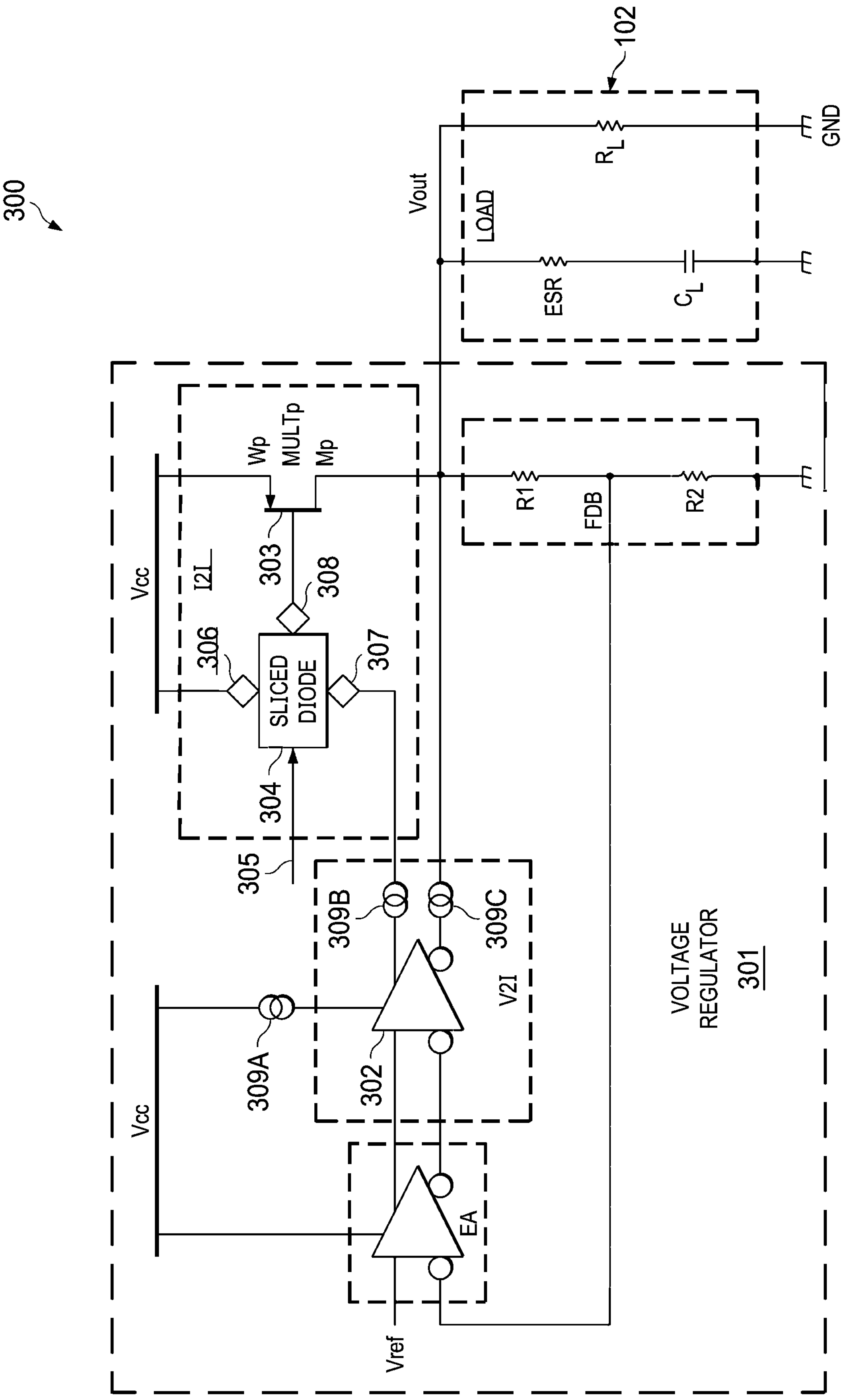
FIG. 3 is a diagram of an example of a voltage regulator with sliced pole tracking circuitry, according to some embodiments.

To address these, and other concerns, systems and methods described herein describe voltage regulators with sliced pole tracking. In that regard, FIG. 3 is a diagram of an example of voltage regulator 301 with sliced pole tracking circuitry 304, according to some embodiments.

As shown, voltage regulator 301 comprises two main circuit blocks: a voltage-to-current converter (V2I) and a sliced pole tracking current-to-current converter (I2I). The output(s) of error amplifier (EA) are coupled to corresponding input(s) of the voltage-to-current converter. Both the error amplifier and the voltage-to-current converter receive power from the VCC rail, and current sources 309A-C provide bleed current(s).

In the sliced pole tracking current-to-current converter, which operates as a current mirror, sliced diode circuit 304 is configured to receive control signal 305. Sliced diode circuit 304 is coupled to the VCC rail via terminal 306, to an output of the voltage-to-current converter via terminal 307, and to control terminal(s) of transistor(s) or power device(s) 303 via terminal 308.

The source terminal(s) of transistor(s) 303 are coupled to the VCC supply rail, and the drain or collector terminal(s) of transistor(s) 303 are coupled to load 102. The feedback path (FDB) may again be implemented as a voltage divider including R1 and R2. Particularly, the drain or collector terminal(s) of transistor(s) 103 may be coupled to R1, and R2 may be coupled between R1 and ground (GND). As such, the feedback loop may connect a node between R1 and R2 to the inverting input of the error amplifier.

As such, voltage regulator 301 may include a current mirror (I2I) whose gain changes (i.e., it is reduced) as the load current decreases. This behavior makes the current flowing through sliced diode circuit 304 greater than the current flowing through active load 204 of voltage regulator 201 (FIG. 2), for example. Because the current through sliced diode circuit 304 is greater, its transconductance is higher, and so is the frequency of the resulting pole, when compared to conventional circuits.

Figure 4:
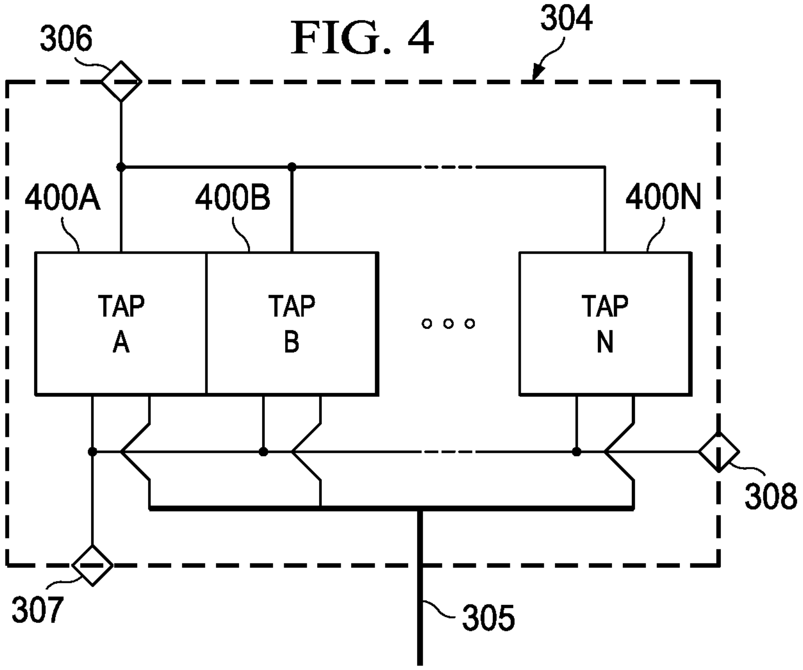
FIG. 4 is a diagram of an example of a sliced diode circuit, according to some embodiments.

To further inform our understanding of the operation of voltage regulator 301, FIG. 4 shows a diagram of an example of sliced diode circuit 304, according to some embodiments. Particularly, sliced diode circuit 304 comprises of a discrete number of taps or slices 400A-N.

Slices 400A-N smoothly switch on and off in response to the behavior of the output current load and power device 303. In operation, slices 400A-N convert an input current (IINP) to a control voltage (VD) that drives power device 303. Meanwhile, power device 303 converts the drive voltage to an output current, which is provided to load 102.

In various implementations, each of slices 400A-N may contain a diode element and a resistor element (Rtrip). Within each of slices 400A-N, the resistor element may be coupled in series to a drain terminal of the diode.

Moreover, each of slices 400A-N may alternate its mode of operation between a diode behavior (increasing its contribution to the current mirror's gain) and a resistor behavior (reducing its contribution) in response to the output current to load 102 approaching, reaching, meeting, nor overcoming a selected trip point (IOUTrip) value.

For each of slices 400A-N, an output current trip point (IOUTrip) may be selected. In some cases, each of slices 400A-N may be associated with a different load current trip point. Below the selected trip point, the combination of slice 400A and power device 103 behaves as a current mirror. Above the trip point, the combination behaves as a fixed current source. All slice and power device combinations add together, in a parallel configuration.

The sum of all diodes in slices 400A-N coupled may be deemed an "equivalent diode." As the current flowing across the equivalent diode increases, the voltage across the resistor (s) increases until the diode becomes saturated. Beyond its saturation, the current flowing across the equivalent diode is fixed and has no further role in the current mirror's gain.

To illustrate these principles, consider a slice that includes a device connected as a diode, with a resistor coupled to its drain or collector terminal. The slice's gain (GAINtrip) is defined by the ratio (Md, Mp) between the slice's diode device and power device 301—e.g., (Wp*MULTp)/(Wd*MULTd) for MOS devices (where W is width of the transistor, 'MULT' is number of instances in parallel, 'd' stands for diode, and 'p' stands for output transistor) or (Ap*ISp)/(Ad*ISd) for bipolar devices (where 'A' is an emitter area 'IS' and is a current density).

The load current trip point (IOUTtrip) is defined by this ratio, the diode's threshold voltage ($V_{TH}$), and resistance (Rtrip). In a first order approximation, it can be stated that:

$$\text{IOUTrip}/\text{GAINtrip}^{*}V_{TH}=R\text{trip}$$

As the load current increases, each slice changes its operation from diode to linear or resistor-like behavior when the diode saturates. For example, in very low load current conditions, all slices behave as a mirror, and the mirror's gain is given by:

$$IOUT/IINP=Mp/(Md0+Md1+\ldots Mdn)$$

Then, when load current reaches trip point 'n,' the combination of power device 301 and slice 400N stops behaving as a mirror (because Mdn saturates) and delivers a fixed current IOUTripn. From trip point 'n' to 'n−1,' the mirror's gain changes to:

$$(IOUT-IOUTripn)/IINP=Mp/(Md0+Md1+Mdn-1)$$

Finally, when the last of slices 400A-N switches its operation:

$$(IOUT-IOUTtripn-\ldots-IOUTtrip1)=Mp/Md0$$

With respect to control signal 305, which may be provided by a microcontroller, different implementations may include: dynamic control and quasi-static control. Dynamic control may employ a combination of analog and digital techniques. For instance, the error amplifier may output both the analog current that goes to the mirror diode, as well as digital controls (it may also include an error to digital converter and additional processing) that enable and disable one or more of the controlled slices dynamically.

Conversely, with quasi-static control, a microcontroller may set up an optimum mirror gain based upon characteristics of load 102. For example, if a circuit designer knows the values of the currents handled by voltage regulator 301 beforehand, they may adjust the number of slices N to maintain an optimum working condition for regulator 301.

Figure 5:
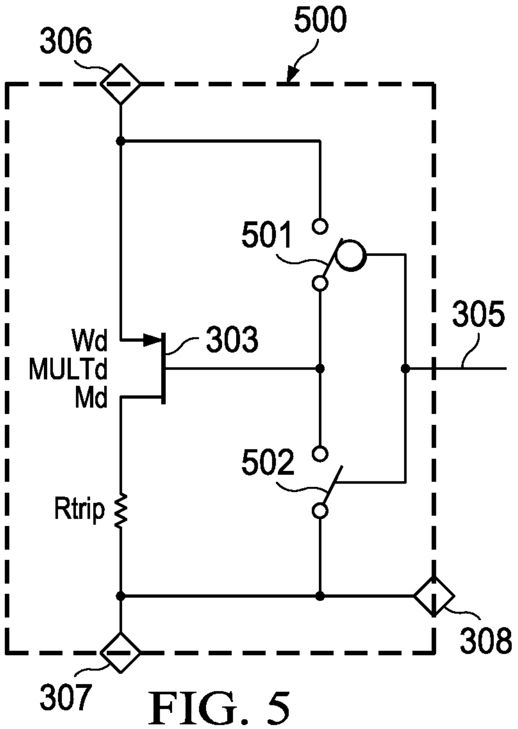
FIG. 5 is a diagram of an example of a controlled single slice circuit, according to some embodiments.

FIG. 5 is a diagram of an example of controlled single slice circuitry 500 usable to implement any of slices 400A-N with dynamic control. In this embodiment, terminal 306 is coupled to inverted switch 501, which in turn is coupled to the source or emitter terminal(s) of transistor(s) 301. The drain or collector terminal(s) of transistor(s) 301 are coupled in series with resistor (Rtrip), which in turn is coupled to terminal 307.

Inverted switch 501 is coupled to switch 502, and switch 502 is coupled to terminals 307 and 308. Control signal 305 is applied to switches 501 and 502 at the same time. Moreover, the control terminal(s) of transistor 301 are coupled to a node between switches 501 and 502, thus selectively enabling or disabling slice 500 under control of the microcontroller.

Figure 6:
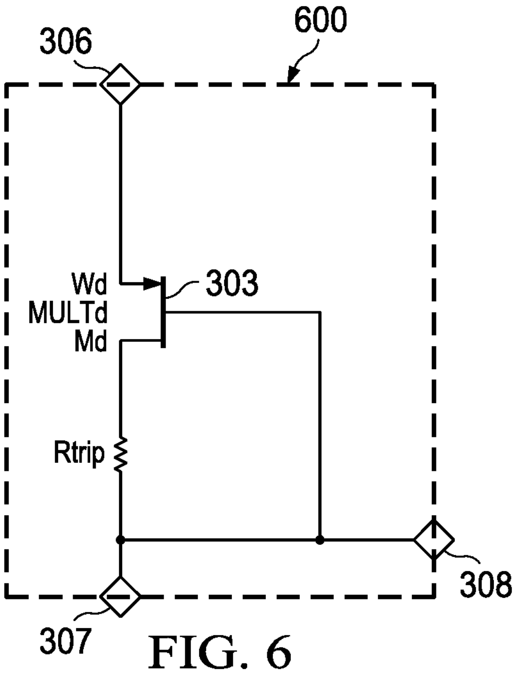
FIG. 6 is a circuit diagram of an example of a static single slice circuit, according to some embodiments.

FIG. 6 is a circuit diagram of an example of static single slice circuitry 600 usable to implement any of slices 400A-N with quasi static controls. In this embodiment, terminal 306 is coupled to the source or emitter terminal(s) of transistor(s) 301. The drain or collector terminal(s) of transistor(s) 301 are coupled in series with resistor (Rtrip), which in turn is coupled to terminal 307. The control terminal(s) of transistor 301 are coupled to terminals 307 and 308.

Figure 7:
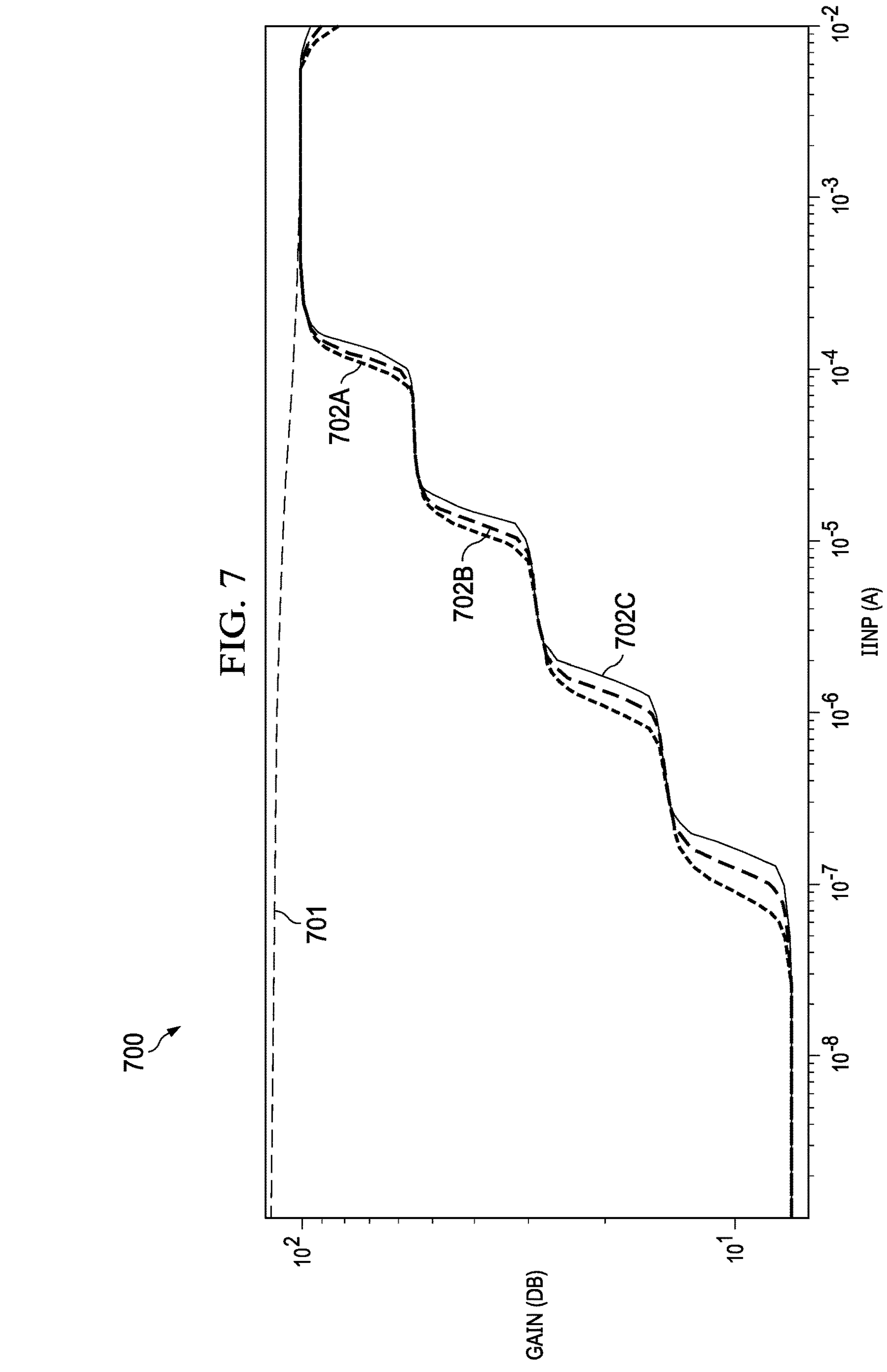
FIG. 7 show graphs of examples of voltage regulator transfer curves, according to some embodiments.

FIG. 7 shows graph 700 with examples of voltage regulator transfer curves 702A-C at different temperatures from minimum to maximum gain in discrete steps when voltage regulator 301 is implemented with sliced pole tracking circuitry 304 (FIG. 3).

In this embodiment, 4 slices were used such that: Mdi=1, 1, 2, 4, and 8; Mp=100; and Rtrip=0.25 kΩ, 200 kΩ, 1.6 MΩ, and 12.8 MΩ.

Curve 701 depicts the current gain of conventional voltage regulator 201 (FIG. 2) when active pole tracking circuitry 204 is used (the current gain is nearly constant), for sake of comparison. In contrast, curves 700A-C depict a transfer curve of voltage regulator 301 at three different temperatures as it goes from a minimum gain (7.5 dB at IOUT=300 nA) to maximum gain (100 dB at IOUT=300 pA) in four steps, each step equally spaced from the next by one decade. It should be noted that curves 700A-C of graph 700 show a largely temperature-independent operation of voltage regulator 301.

Figure 8:
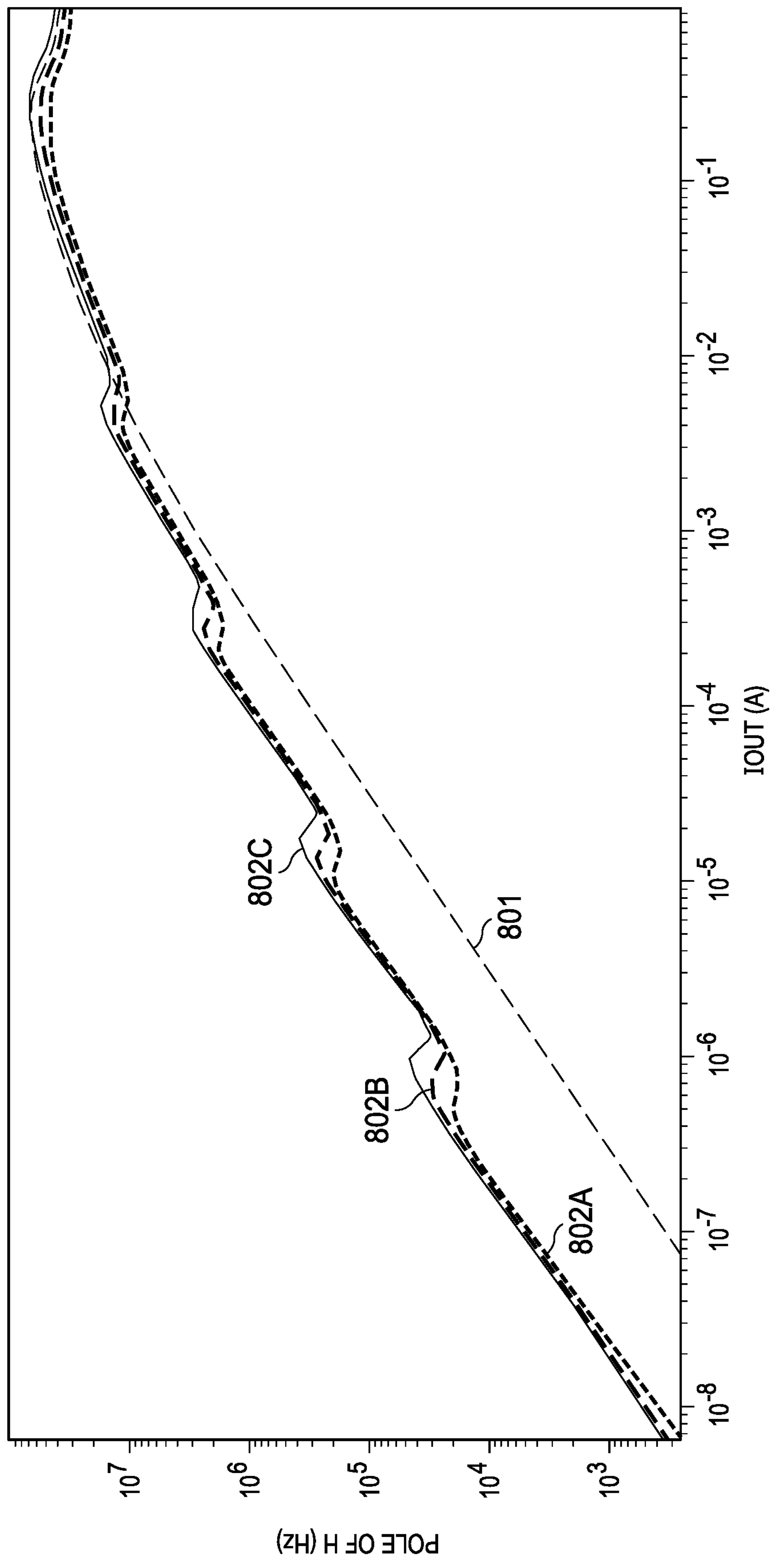
FIG. 8 show graphs of examples of pole tracking curves, according to some embodiments.

FIG. 8 shows graph 800 with examples of pole tracking curves 802A-C when voltage regulator 301 is implemented with sliced pole tracking circuitry 304 (FIG. 3). As the load current (IOUT) decreases, the pole is pushed to a higher frequency than other pole-tracking techniques.

For example, consider that at maximum load current the second stage's current gain is 'Gmax' and that its pole is 'Fmax.' In that case, in a minimum load condition, Fmin=Fmax*Gmin/Gmax. Furthermore, each intermediate pole frequency may be expressed as Ftripi=Fmax*Gtripi/Gmax.

It may be noted that trips points can be placed at any selected frequency, which provides freedom for stabilizing the circuit at different loading conditions. In the example of FIG. 7, the lowest (leftmost) of the 4 poles in curves 802A-C is pushed one decade above a curve 801, which shows the pole tracking operation of voltage regulator 201 using conventional active pole tracking circuitry 204 (FIG. 2).

Figure 2:
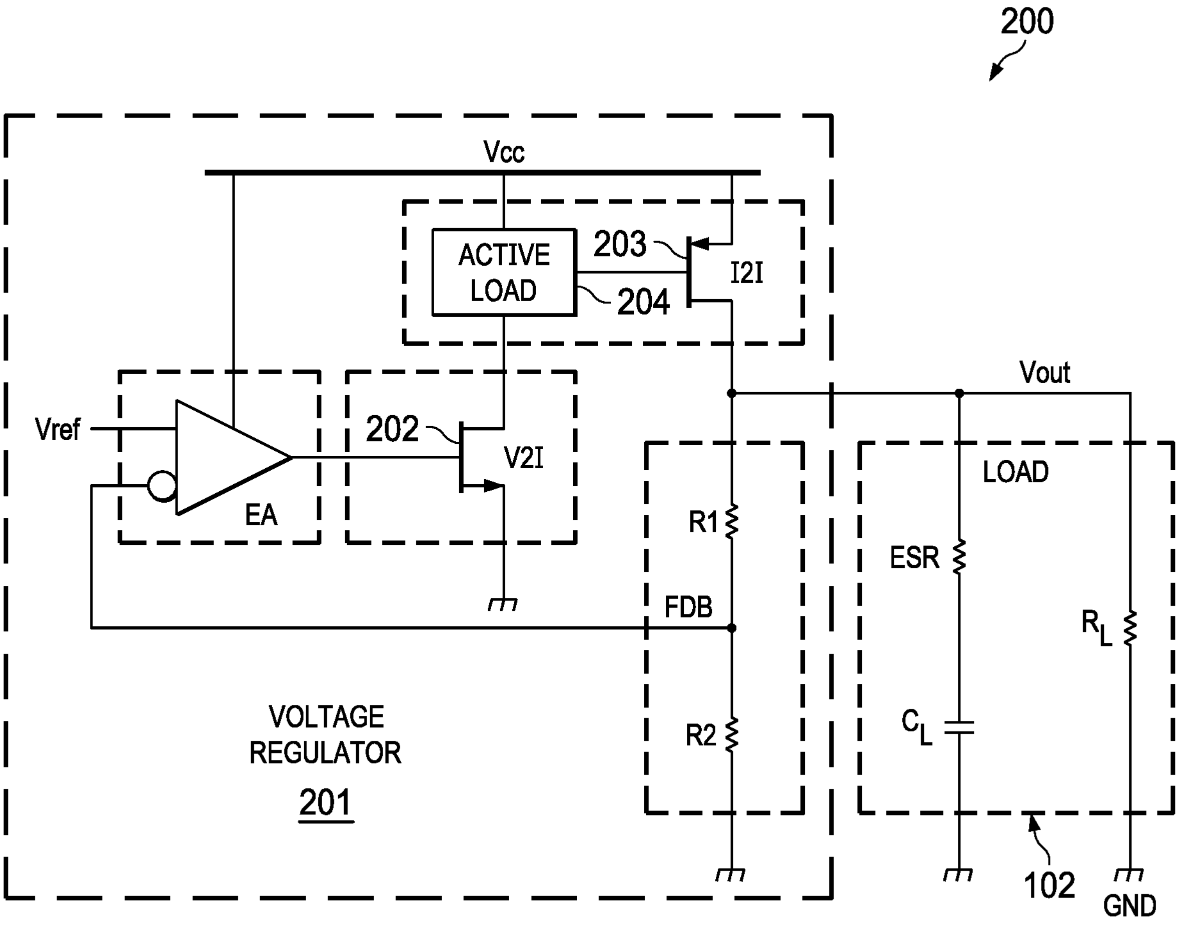
FIG. 2 (PRIOR ART)
FIG. 2 is a diagram of a conventional voltage regulator with active pole tracking circuitry ("Prior Art").

It may also be noted that pole tracking curve 801 of conventional voltage regulator 201 involves a continuous control of the pole function of the output current (FIG. 2). Unlike curves 802A-C obtained with voltage regulator 301, in curve 801 the pole varies linearly with the output current. There is no freedom to adjust the slope of the relation that links Fm to Iout, and the gain current remains fixed, which does not help reduce the frequency unity gain of the complete feedback loop.

In contrast, in some implementations of voltage regulator 301, the greater the number of trip points, the farther the pole can be pushed from former pole tracking configurations. The closer the trip points, the sooner the pole exits from former pole-tracking configurations.

As such, systems and methods described herein may enable the use of a finite set of trip points for better gain/pole controllability, and these trip points may be arbitrarily set up. The voltage regulator's open loop gain may be adjusted at multiple output current levels; as the output current decreases, the open loop gain decreases as well. The pole frequency also decreases, but at a slower rate. As it happens at multiple trips points, the effect accumulates offering a wider control dynamic. In heavy load conditions, the gain is not cut (because the load's impedance is reduced) to ensure stability, but it reaches its maximum value.

In an illustrative, non-limiting embodiment, a voltage regulator may include: an error amplifier, a voltage-to-current converter coupled to the error amplifier, and a current-to-current converter coupled to the voltage-to-current converter, where the current-to-current converter comprises a sliced pole tracking circuit coupled to a power device, and where the power device is configured to provide an output voltage to a load.

The sliced pole tracking circuit may be configured to: receive an input current from the voltage-to-current converter; convert the input current to a drive voltage; and apply the drive voltage to a control terminal of the power device, where the power device is configured to convert the drive voltage into an output current provided to the load.

The sliced pole tracking circuit may include a plurality of slices coupled in parallel with each other, and each slice may be associated with a different load current trip point. Below a given load current trip point, a slice associated with the given load current trip point in combination with the power device collectively may behave as a current mirror. Above the given load current trip point, the slice in combination with the power device may collectively behave as a current source.

In various implementations, each slice may include a diode and resistor. A gain of a given slice may be determined based upon a ratio between a channel width of a given diode of a given slice and another channel width of the power device. The given channel width may be the same as the other channel width.

In response to an increase in a load current, at least one slice may transition from diode behavior to resistor behavior. For example, the at least one slice may transition from diode behavior to resistor behavior as the load current approaches a load current trip point corresponding to the at least one slice.

In response to another increase in the load current, another slice may transition from diode behavior to resistor behavior. For example, the other slice may transition from diode behavior to resistor behavior as the load current approaches another load current trip point corresponding to the other slice.

In response to a reduction in a load current, the at least one slice may transition from resistor behavior to diode behavior. For example, the at least one slice may transition from resistor behavior to diode behavior as the load current approaches a load current trip point corresponding to the at least one slice.

In response to another reduction in the load current, another slice may transition from resistor behavior to diode behavior. For example, the other slice may transition from resistor behavior to diode behavior as the load current approaches another load current trip point corresponding to the other slice.

In another illustrative, non-limiting embodiment, a method may include: receiving an indication of a load current at a sliced pole tracking circuit coupled to a power device in a voltage regulator, where the sliced pole tracking circuit comprises a plurality of slices, and at least one of: switching a behavior of a slice from a diode to a resistor in response to the load current increasing above a load current trip point associated with the slice, or switching the behavior of the slice from the resistor to the diode in response to the load current decreasing below the load current trip point.

The method may also include: receiving, at the sliced pole tracking circuit, an input current from a voltage-to-current converter coupled to an error amplifier; converting the input current to a drive voltage; and applying the drive voltage to a control terminal of the power device.

In yet another illustrative, non-limiting embodiment, an electronic device may include: a load and a voltage regulator coupled to the load, where the voltage regulator comprises a sliced pole tracking circuit coupled to a power device, where the sliced pole tracking circuit comprises a plurality of slices coupled in parallel, where each slice is associated with a different load current trip point, and where the power device is configured to provide an output voltage to the load.

In response to an increase in a load current above a given load current trip point, at least one slice may transition from diode behavior to resistor behavior, and in response to a reduction in the load current below the given load current trip point, the at least one slice may transition from resistor behavior to diode behavior.

Systems and methods for providing voltage regulators with sliced pole tracking are discussed. In some embodiments, a voltage regulator may include: an error amplifier, a voltage-to-current converter coupled to the error amplifier, and a current-to-current converter coupled to the voltage-to-current converter, where the current-to-current converter comprises a sliced pole tracking circuit coupled to a power device, and where the power device is configured to provide an output voltage to a load.

In many implementations, systems and methods described herein may be incorporated into a wide range of electronic devices including, for example, computer systems or Information Technology (IT) products such as servers, desktops, laptops, memories, switches, routers, etc.; telecommunications hardware; consumer devices or appliances such as mobile phones, tablets, wearable devices, Internet-of-Things (IoT) devices, television sets, cameras, sound systems, etc.; scientific instrumentation; industrial robotics; medical or laboratory electronics such as imaging, diagnostic, or therapeutic equipment, etc.; transportation vehicles such as automobiles, buses, trucks, trains, watercraft, aircraft, etc.; military equipment, etc. More generally, these systems and methods may be incorporated into any device or system having one or more electronic parts or components.

For sake of brevity, conventional techniques related to signal processing, sampling, sensing, analog-to-digital conversion, computer architecture, and PWM, have not been described in detail herein. Furthermore, the connecting lines shown in the various figures contained herein have been intended to illustrate relationships (e.g., logical) or physical couplings (e.g., electrical) between the various elements. It should be noted, however, that alternative relationships and connections may be used in other embodiments. Moreover, circuitry described herein may be implemented either in silicon or another semiconductor material or alternatively by software code representation thereof.

Although the invention(s) are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A voltage regulator, comprising:

an error amplifier;

a voltage-to-current converter coupled to the error amplifier; and a current-to-current converter coupled to the voltage-to-current converter, wherein the current-to-current converter comprises a sliced pole tracking circuit coupled to a power device, and wherein the power device is configured to provide an output voltage to a load, wherein the sliced pole tracking circuit comprises a plurality of slices coupled in parallel with each other, wherein each slice is associated with a different load current trip point, and wherein each slice comprises a diode and resistor.

2. The voltage regulator of claim 1, wherein the sliced pole tracking circuit is configured to:

receive an input current from the voltage-to-current converter;

convert the input current to a drive voltage; and apply the drive voltage to a control terminal of the power device, wherein the power device is configured to convert the drive voltage into an output current provided to the load.

3. The voltage regulator of claim 1, wherein below a given load current trip point, a slice associated with the given load current trip point in combination with the power device collectively behave as a current mirror.

4. The voltage regulator of claim 3, wherein above the given load current trip point, the slice in combination with the power device collectively behave as a current source.

5. The voltage regulator of claim 1, wherein a gain of a given slice is determined based upon a ratio between a channel width of a given diode of a given slice and another channel width of the power device.

6. The voltage regulator of claim 5, wherein the given channel width is the same as the other channel width.

7. The voltage regulator of claim 1, wherein in response to an increase in a load current, at least one slice transitions from diode behavior to resistor behavior.

8. The voltage regulator of claim 7, wherein the at least one slice transitions from diode behavior to resistor behavior as the load current approaches a load current trip point corresponding to the at least one slice.

9. The voltage regulator of claim 8, wherein in response to another increase in the load current, another slice transitions from diode behavior to resistor behavior.

10. The voltage regulator of claim 9, wherein the other slice transitions from diode behavior to resistor behavior as the load current approaches another load current trip point corresponding to the other slice.

11. The voltage regulator of claim 1, wherein in response to a reduction in a load current, at least one slice transitions from resistor behavior to diode behavior.

12. The voltage regulator of claim 11, wherein the at least one slice transitions from resistor behavior to diode behavior as the load current approaches a load current trip point corresponding to the at least one slice.

13. A method, comprising:

receiving an indication of a load current at a sliced pole tracking circuit coupled to a power device in a voltage regulator, wherein the sliced pole tracking circuit comprises a plurality of slices, each slice associated with a different load current trip point and each slice comprising a diode and a resistor; and at least one of:

switching a behavior of a slice from a diode behavior to a resistor behavior in response to the load current increasing above a load current trip point associated with the slice; or switching the behavior of the slice from the resistor behavior to the diode behavior in response to the load current decreasing below the load current trip point associated with the slice.

14. The method of claim 13, further comprising:

receiving, at the sliced pole tracking circuit, an input current from a voltage-to-current converter coupled to an error amplifier;

converting the input current to a drive voltage; and applying the drive voltage to a control terminal of the power device.

15. An electronic device, comprising:

a load; and a voltage regulator coupled to the load, wherein the voltage regulator comprises a sliced pole tracking circuit coupled to a power device, wherein the sliced pole tracking circuit comprises a plurality of slices coupled in parallel, wherein each slice is associated with a different load current trip point, wherein each slice comprises a diode and resistor, and wherein the power device is configured to provide an output voltage to the load.

16. The electronic device of claim 15, wherein in response to an increase in a load current above a given load current trip point, at least one slice transitions from diode behavior to resistor behavior, and wherein in response to a reduction in the load current below the given load current trip point, the at least one slice transitions from resistor behavior to diode behavior.

* * * * *